United States Patent [19]
Platsis

[11] Patent Number: 5,598,883
[45] Date of Patent: Feb. 4, 1997

[54] VEHICULAR SUN SHIELD

[76] Inventor: Kostas I. Platsis, 721 Umbra St., Baltimore, Md. 21224

[21] Appl. No.: 488,834

[22] Filed: Jun. 9, 1995

[51] Int. Cl.$^6$ ........................................................ B60J 3/00
[52] U.S. Cl. .................................. 160/370.23; 160/84.07; 296/97.8; 296/97.7
[58] Field of Search .................. 160/370.21, 370.22, 160/370.23, 368.1, 84.07, 84.04, 134; 296/97.1, 97.8, 97.7, 97.12, 97.13, 97.4

[56] References Cited

U.S. PATENT DOCUMENTS

| | | | |
|---|---|---|---|
| 2,859,756 | 11/1958 | Barnes . | |
| 4,332,414 | 6/1982 | Surtin . | |
| 4,606,572 | 8/1986 | Maguire . | |
| 4,681,149 | 7/1987 | Tung-Chow . | |
| 4,776,380 | 10/1988 | Lester | 160/134 |
| 4,824,161 | 4/1989 | Lee | 296/97.8 |
| 4,861,090 | 8/1989 | Gavieli | 160/134 |
| 5,117,889 | 6/1992 | Coe | 160/134 |
| 5,139,070 | 8/1992 | Kidd | 160/134 X |

FOREIGN PATENT DOCUMENTS

| | | | |
|---|---|---|---|
| 634739 | 2/1962 | Italy | 296/97.8 |
| 178934 | 4/1962 | Switzerland | 296/97.8 |

Primary Examiner—Blair Johnson

[57] ABSTRACT

My invention realtes to an automobile shading device which includes a pair of extendable channels pivotally joined at their respective inner ends to a 45 degree center portion. As a result, the channels can open and close in a horizontal fashion.

The device can be removably attached to a window by suction cup located on the outside of the center portion and by velcro between the channels and the dashboard. Each channel includes an arm and a plurality of pleats. Each arm is pivotally joined to the channel at its inner end, and it opens and closes in a perpendicularly circular fashion, thus, when open unfolding the pleats in an angular shape covering the entire window. The top and bottom pleats are attached to the arm and the channel respectively by two-sided tape.

When the pleats are unfolded the angular shape is obtained by a uniformally asymmetrical cutting method in a zig-zag fashion.

11 Claims, 6 Drawing Sheets

VEHICULAR SUN SHIELD

FIELD OF THE INVENTION

The present invention concerns a sun shield for the windshield of a vehicle and, in particular, discloses a pleated panel which when unfolded develops into an angular shape. It also folds to a compact form.

DESCRIPTION OF A PRIOR ART

When a vehicle is left unattended in the sun the vehicle becomes very overheated. In order to reduce the heat buildup various devices have been proposed. The most common device is a foldable fiberboard panel which is placed adjacent to the windshield. These devices are awkward to install, inconvenient to store in the vehicle, and do not effectively cover the entire windshield. As an applicant I am also aware of sunshields which open in a fan-like manner as follows:

| U.S. Pat. No. | Inventors |
| --- | --- |
| 4,332,414 | Surtin |
| 4,606,572 | Maguire |
| 4,681,149 | Tung-Chow |

All of the devices disclose a fan-like shape which opens through approximately 360 degrees, and is used on the window of the vehicle.

I am also aware of U.S. Pat. No. 4,861,090 by Gavrieli which discloses a fan-like shade which opens approximately 90 degrees. While these sunshields have utility, they are not practical to manufacture, and have not been generally accepted.

SUMMARY OF THE INVENTION

It is an object of my present invention to provide a sunshield which can be compactly folded to occupy a minimum of space and can be readily and simply installed adjacent to the windshield and the dashboard of the vehicle.

It is a further object of my present invention to provide a sunshield which may be adjusted to fully cover the windshield of a vehicle, recognizing that windshields are not uniform in shape and size.

It is another object of my invention to provide a sunshield which can be secured into an open position, or into a closed position.

In accordance with the teachings of the present invention, there is disclosed a sunshield to be used inside the windshield of a vehicle. The sunshield has a left portion, a right portion, and a smaller center portion therebetween. The left portion and the right portion each has a respective channel and arm. The left channel is pivotally joined at its inner end to the center portion. The left arm is pivotally joined to the inner sides of the left channel. The right channel is pivotally joined at its inner end to the center portion. The right arm is pivotally joined to the inner sides of the right channel. Further, the left portion and the right portion each has a plurality of pleats; each pleat has an inner and an opposite outer end. The inner ends of the pleats of the left portion are pivotally joined to the left channel. The inner ends of the pleats of the right portion are pivotally joined to the right channel. All of the pleats of the left portion and all of the pleats of the right portion may be pivotally moved to a horizontal position by moving the arms. In this manner, an unobstructed view through the windshield is permitted. The respective pleats in the left portion and in the right portion may be each independently pivotally moved, by moving the respective arm, into a maximum of approximately 90 degrees in a perpendicularly circular fashion. At which position the sunshield opens into an angular shape, thus, covering the entire windshield by a uniformally asymmetrical method of cutting said pleats.

In another aspect of the present invention the center portion has an angle of approximately 45 degrees to accommodate the angle between the windshield and the dashboard.

In another aspect of my invention, the left and the right channels are extendable to accommodate various dimensions of windshields.

In another aspect of my invention, the left and the right channels can fold in half in a horizontally circular fashion by being pivotally joined at their inner ends to the center portion.

DESCRIPTION OF THE PREFERRED EMBODIMENTS

Figure 1:
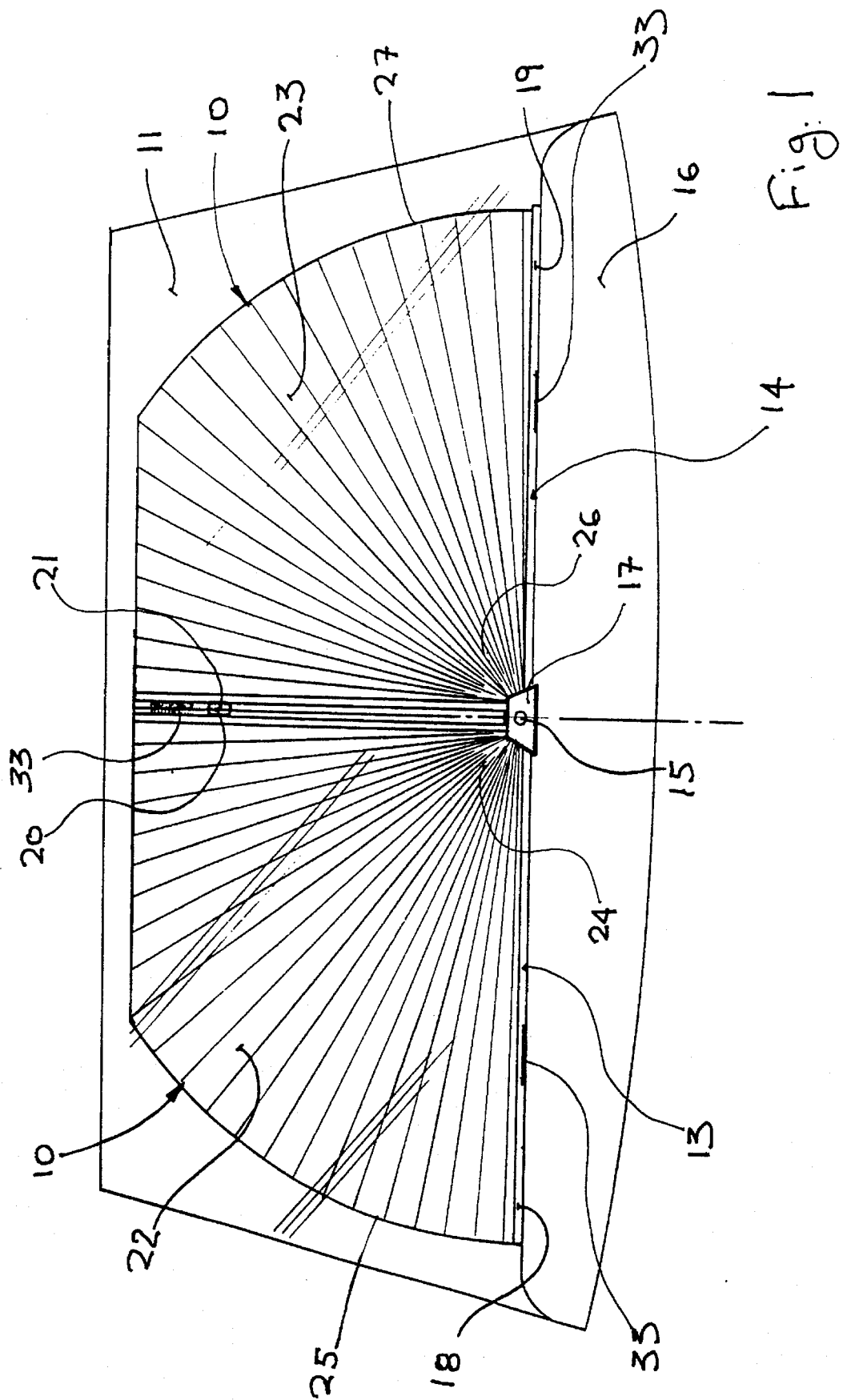
FIG. 1 is a perspective view of the sunshield of my invention disposed adjacent to the windshield of a vehicle and open to protect the vehicle from the sun.
Figure 2:
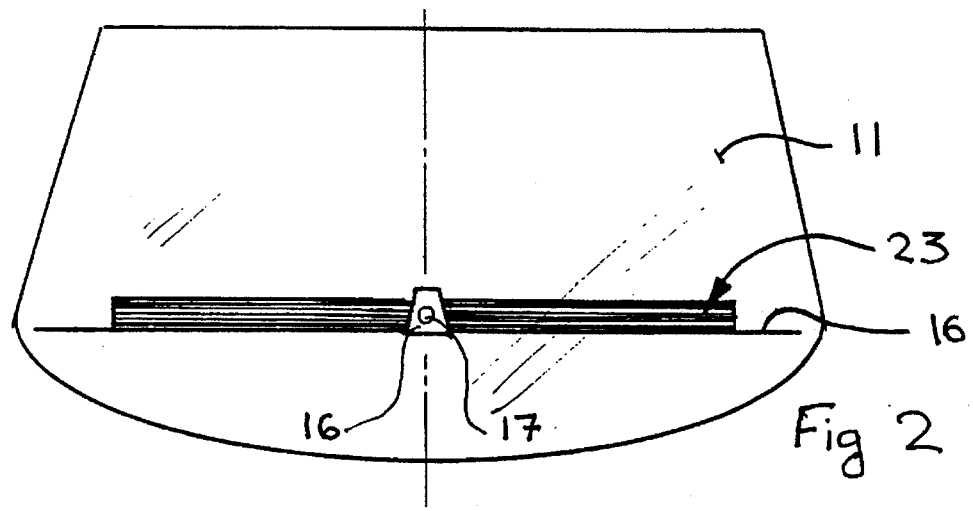
FIG. 2 is a perspective view of the sunshield folded into a closed position.
Figure 3:
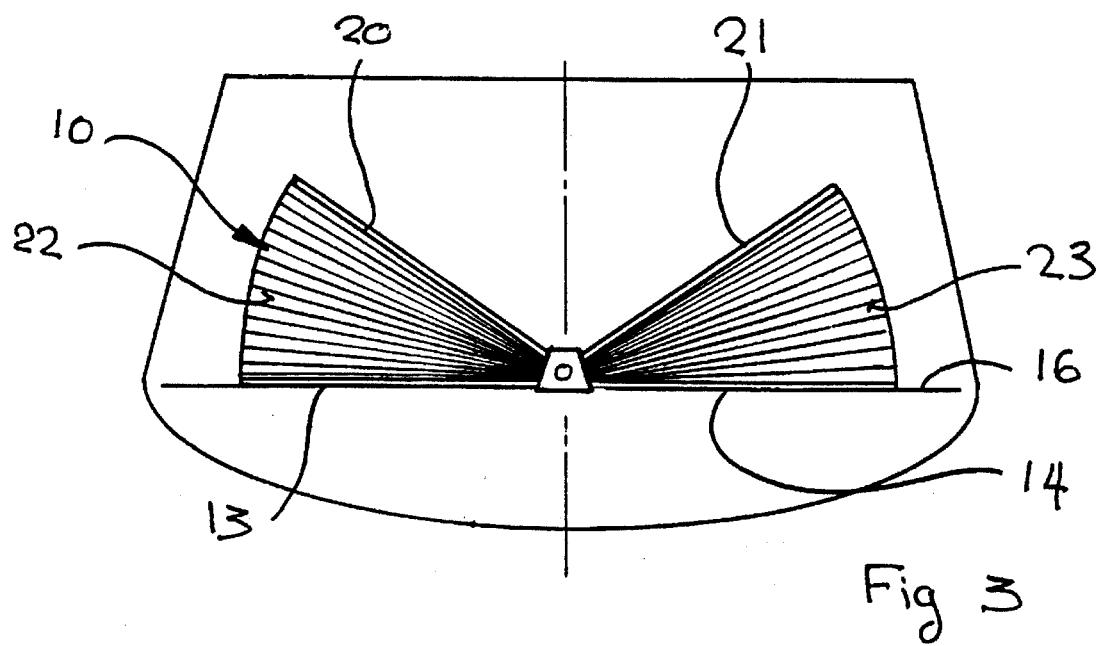
FIG. 3 is a perspective view of the sunshield showing pivotal movement of the pleats of the portions of the sunshield.

With reference to FIG. 1, a sunshield 10 is shown to be used inside the windshield 11 of a vehicle to protect the interior from the heat.

Figure 8:
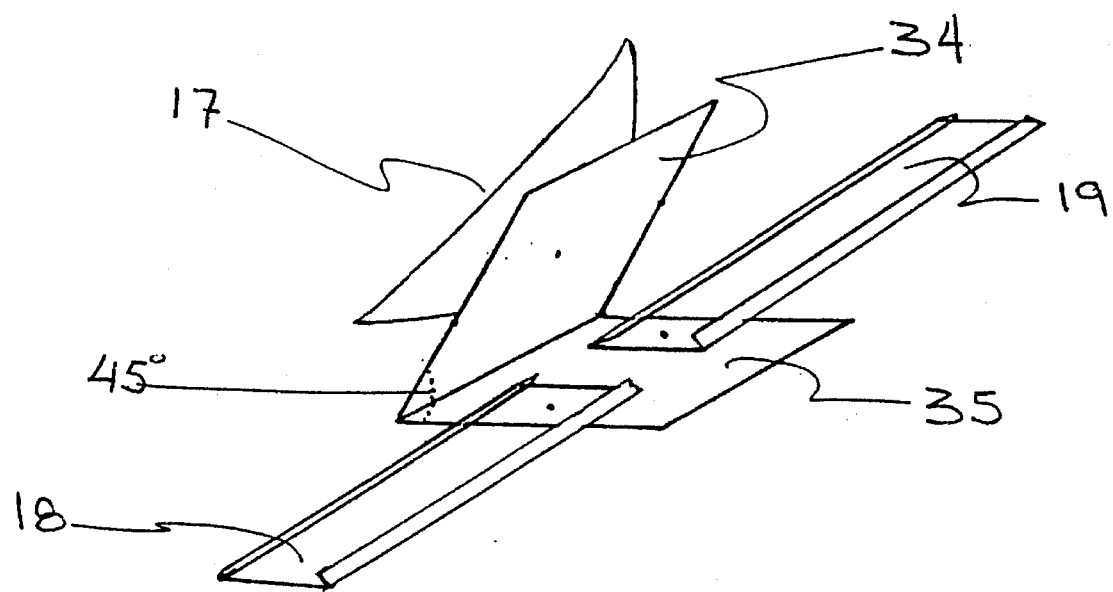
FIG. 8 is a perspective side view of the center portion showing the suction cup, frontal side, and bottom side of the center portion at a 45 degree angle.

The sunshield 10 has a left portion 13 and a right portion 14. A smaller center portion 15 is connected between the left portion 13 and the right portion 14. Further, center portion 15 (FIG. 8) has a frontal side 34 and a bottom side 35 at an angle of 45 degrees. The center portion 15 has an angle approximately 45 degrees to accommodate the angle between the windshield 11 and the dashboard 16, thus, providing a stronger hold between the suction cup 17 and the windshield 11.

The left portion 13 has a left channel 18 and the right portion 14 has a right channel 19 which channels are pivotally joined at their inner ends to the center portion 15, thus, permitting a horizontally circular motion to serve a dual purpose: firstly, to adjust the left 18 and the right channel 19 along the dashboard 16 at an angle according to the curve of the windshield 11; secondly, to keep the sunshield 10 folded for storage.

Figure 5:
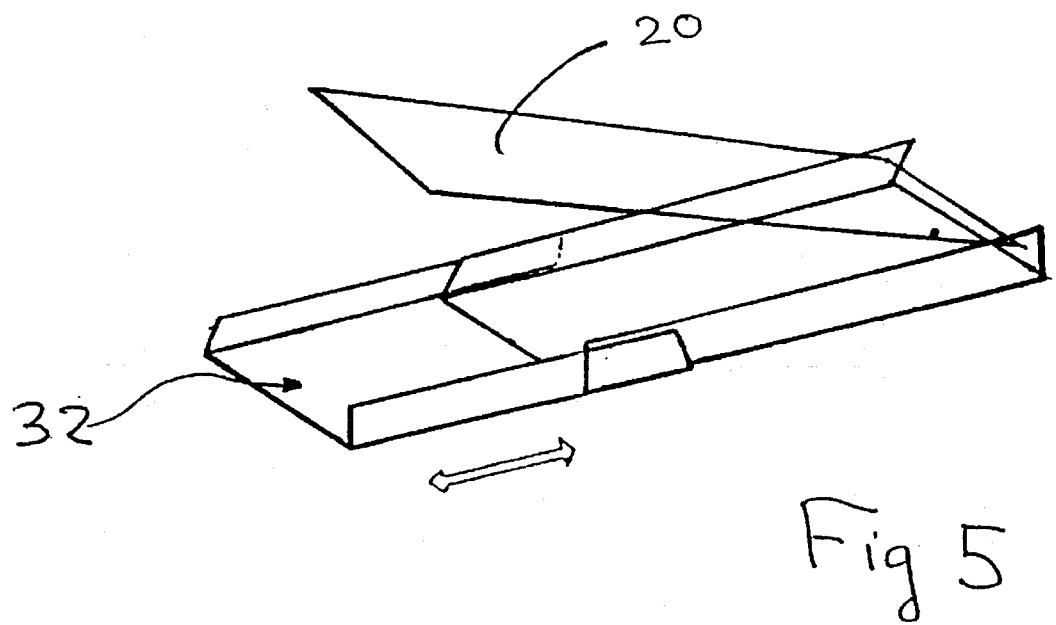
FIG. 5 is a perspective view of one of the channels with the arm partially open. It also shows the extendable portion of the channel.
Figure 6:
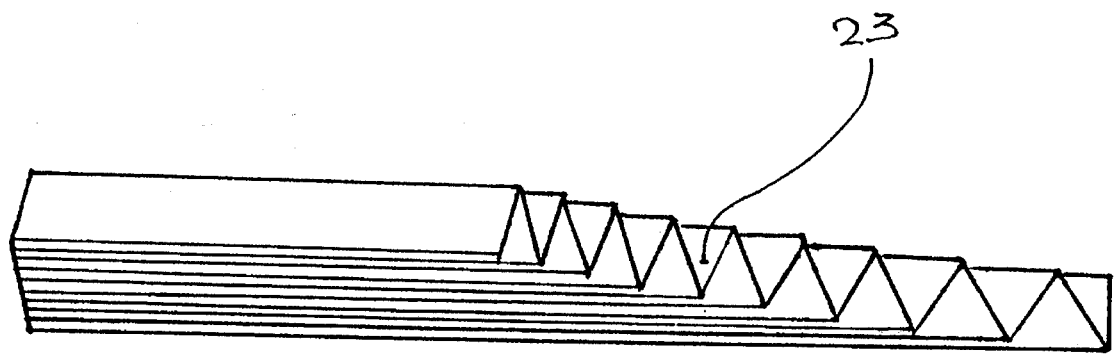
FIG. 6 is a perspective view of the pleats at a closed position cut in a zig-zag fashion.
Figure 7:
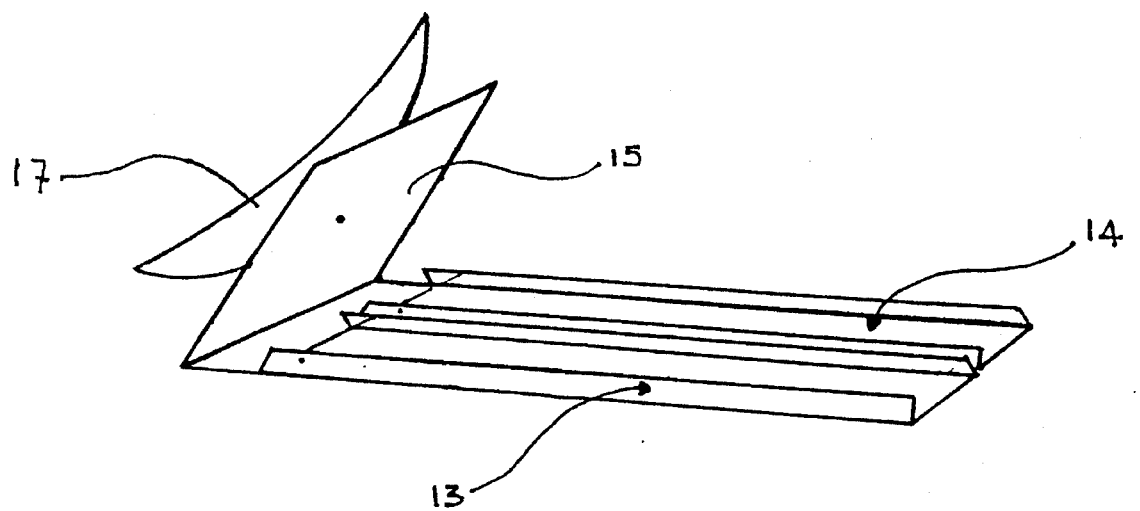
FIG. 7 is a perspective view of the sunshield at a folded position.

Further, the left portion 13 has a left arm 20 which is pivotally joined to the inner end of the sides of the left channel 18 (FIG. 5), and the right portion 14 also has a right arm 21 which is pivotally joined to the inner sides of the right channel 19, thus, permitting the left arm 20 and the right arm 21 to a perpendicularly circular motion of approximately 90 degrees. Further, the left channel 18 has a plurality of left pleats 22. The bottom pleat of pleats 22 is attached to the top side of the base of the left channel 18 by a double-sided tape. The top pleat of pleats 22 is attached to the left arm 20 by double-sided tape.

Figure 4:
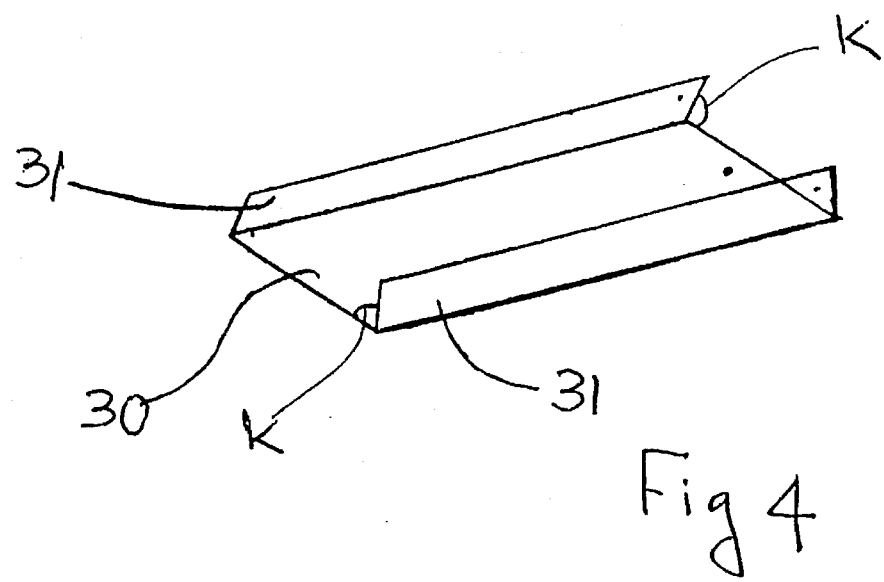
FIG. 4 is a perspective view of one of the channels the sides of which are at an angle with respect to the base of the channel.

The right channel 19 also has a plurality of right pleats 23. The bottom pleat of pleats 23 is attached to the top side of the base of the right channel 19 by double-sided tape. The top pleat of pleats 23 is attached to the right arm 21 by double-sided tape. The left pleats 22 have an inner end 24 and an outer end 25. The inner end 24 of the left pleats 22 is pivotally joined to the inner end of the left channel 18. The right pleats 23 have an inner end 26 and an outer end 27. The inner end 26 of the right pleats 23 is pivotally joined to the inner end of the right channel 19. The respective left arm 20 and the right arm 21 may be pivotally moved independently in a perpendicularly circular motion to a maximum of approximately 90 degrees from the respective left channel 18 and right channel 19. Further, left channel 18 and right channel 19 have an angle K less than 90 degrees between the base 30 and the sides of the channels 31 (FIG. 4). This angular effect of the sides allows a length adjustment of the channels by sliding another shorter channel 32 (FIG. 5) to the left channel 18 and the right channel 19 respectively. Further, left channel 18 and right channel 19 are attached to the dashboard by means of hook-and-loop such as Velcro(™) 33. Also by means of Velcro(™) 33 the arms 20 and 21 are connected when pivotally moved approximately 90 degrees and are adjacent to one another.

Let's assume that in order to have the right arm open at approximately 90 degrees 25 pleats are needed.

By finding the two middle pleats 12 and 13 cutting starts with pleat 14. Pleat 14 is cut 1¼" long from previous pleat 13 in a zig-zag fashion.

Next pleat 15 is cut 1⅛" long from previous pleat 14 also in a zig-zag fashion. Next pleat 16 is cut 1" long from previous pleat 15 in the same fashion.

This method of cutting is repeated for each pleat thereafter cutting each pleat ⅛" less from the previous one in the same zig-zag fashion until pleat 25 which is cut at the same length as pleat 24.

The same method of cutting is used to cut pleats 11 through 1.

This uniformally asymmetrical cutting gives the sunshield, when open, an angular shape that covers the entire windshield.

What is claimed is:

1. A sunshield to be used inside the windshield of a vehicle, the sunshield comprising: means for removably attaching the sunshield to the window, a left portion, a right portion, and a smaller center portion therebetween, said attaching means being located on said center portion; the left portion and the right portion each having respective left channel and right channels connected by first pivot means to the center portion at respective inner ends about horizontally spaced, substantially vertically extending first pivot axis, said respective first pivot axis permitting said channels to adjust to variously curved windshields; the left channel and the right channel each having a left arm and a right arm pivotally joined by second pivot means to the respective channel; further, each channel having a shade comprising a plurality of pleats, each pleat having inner an outer lateral edges; the inner edges of the pleats of the left portion being pivotally joined to the inner end of the left channel at respective said second pivot means; the inner edges of the pleats of the right portion being pivotally joined to the inner end of the right at it's respective second pivot means wherein all the pleats of the left portion and all the pleats of the right portion may be pivotally moved between a substantially vertical and to a horizontal position adjacent to the respective left and right channels by a pivotal circular movement of the left and right arm, thus, permitting alternate shielding and an unobstructed view through the windshield; the respective pleats in the left portion and in the right portion may be independently pivotally moved by the respective left or right arm to a maximum of approximately 90 degrees; whereby when both arms are so pivotally moved so that the left arm is adjacent to the right arm the sunshield is unfolded in an angular shape that covers the entire windshield.

2. The sunshield of claim 1 further comprising means for connecting the left arm of the left portion to the right arm of the right portion when said arms of the respective portions are pivotally moved approximately 90 degrees and are adjacent to one another.

3. The sunshield of claim 2 wherein the means of connecting is by hook and loop fastener.

4. The sunshield of claim 1 wherein the left portion and the right portion of the shield may be folded in about respective said first axis wherein the channel of the left portion is disposed adjacent to the channel of the right portion by a horizontally circular motion.

5. The sunshield of claim 1 further comprising the center portion defining two flanges disposed at an angle of approximately 45 degrees to accommodate the angle between the windshield and the dashboard.

6. The sunshield of claim 1 further comprising said means for removably attach including a suction cup located on the center portion attaching it to the windshield.

7. The sunshield of claim 1 further comprising additional support means on the outer ends of the left channel and the right channel for engaging the dashboard.

8. The sunshield of claim 1 further comprising fastening means for the pleats when the arms are pressed downward against the channels.

9. The sunshield of claim 1 further comprising each said left and right channels comprising telescoping segments, each segment having sides extending at an acute angle from a base of the channel segment, whereby one channel segment is slidingly retained within another channel segment by said angled sides, thus, accommodating different sizes of windshields.

10. The sunshield of claim 1 further comprising a top pleat of the left portion being attached to the left arm by double-sided tape, and a bottom pleat of the left portion being attached to a top side of a base of the left channel;

a top pleat of the right portion being attached to the right arm by double-sided tape, and a bottom pleat of the right portion being attached to a top side of a base of the right channel.

11. The sunshield of claim 1 further comprising said pleats having uniformally different lengths from each other in a zig-zag fashion, thereby providing for the coverage of the entire windshield by pivotally unfolding said pleats into an angular shape by a circular motion of the left arm and the right arm to a maximum of 90 degrees each.

* * * * *